United States Patent
Vitali et al.

(10) Patent No.: US 10,253,164 B2
(45) Date of Patent: Apr. 9, 2019

(54) HIGHLY EFFECTIVE STABILIZER

(71) Applicant: BASF SE, Ludwigshafen (DE)

(72) Inventors: Manuele Vitali, Bologna (IT); Enrico Galfre, Milan (IT); Davide Alvisi, Bondeno (IT)

(73) Assignee: BASF SE, Ludwigshafen (DE)

(*) Notice: Subject to any disclaimer, the term of this patent is extended or adjusted under 35 U.S.C. 154(b) by 54 days.

(21) Appl. No.: 15/310,686

(22) PCT Filed: May 11, 2015

(86) PCT No.: PCT/EP2015/060366
§ 371 (c)(1),
(2) Date: Nov. 11, 2016

(87) PCT Pub. No.: WO2015/173190
PCT Pub. Date: Nov. 19, 2015

(65) Prior Publication Data
US 2017/0073498 A1  Mar. 16, 2017

(30) Foreign Application Priority Data
May 15, 2014 (EP) ..................................... 14168430

(51) Int. Cl.
*B32B 27/30* (2006.01)
*B32B 27/00* (2006.01)
(Continued)

(52) U.S. Cl.
CPC .......... *C08K 5/34926* (2013.01); *C08K 5/005* (2013.01); *C09K 15/30* (2013.01); *C08K 2201/014* (2013.01)

(58) Field of Classification Search
CPC ................ C08K 5/34926; C08K 5/005; C08K 2201/04; C09K 15/30; C08L 23/04
(Continued)

(56) References Cited

U.S. PATENT DOCUMENTS

| | | | |
|---|---|---|---|
| 4,325,863 | A | 4/1982 | Hinsken et al. |
| 4,338,244 | A | 7/1982 | Hinsken et al. |

(Continued)

FOREIGN PATENT DOCUMENTS

| | | |
|---|---|---|
| CN | 102307940 | 1/2012 |
| DE | 43 16 611 A1 | 11/1993 |

(Continued)

OTHER PUBLICATIONS

Marin et al, Washing Out Oligomeric Triazinic-Hindered Amine from polypropylene, 2000, Journal of applied Polymer Science, vol. 78, 2158-2165 (Year: 2000).*

(Continued)

*Primary Examiner* — Jessica Whiteley
(74) *Attorney, Agent, or Firm* — Oblon, McClelland, Maier & Neustadt, L.L.P.

(57) ABSTRACT

A stabilizer composition containing (I) a compound of the formula (I) and (II) a compound of the formula (II) wherein the radicals $R_1$ independently of one another are $C_1$-$C_{18}$ alkyl or $C_3$-$C_{12}$ cycloalkyl; the radicals $X_1$ independently of one another are hydrogen, $C_1$-$C_{18}$ alkyl, $C_3$-$C_{12}$ cyclo-alkyl or a group of the formula (III-I); (III-I) the radicals $X_2$ independently of one another are hydrogen, $C_1$-$C_{18}$ alkyl, $C_3$-$C_{12}$ cyclo-alkyl or a group of the formula (III-II); (III-II) and Y is $C_2$-$C_{12}$ alkylene.

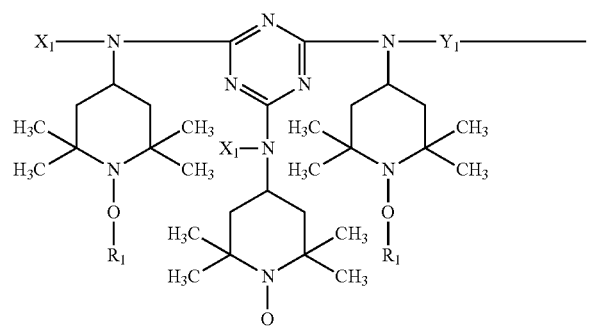

(I)

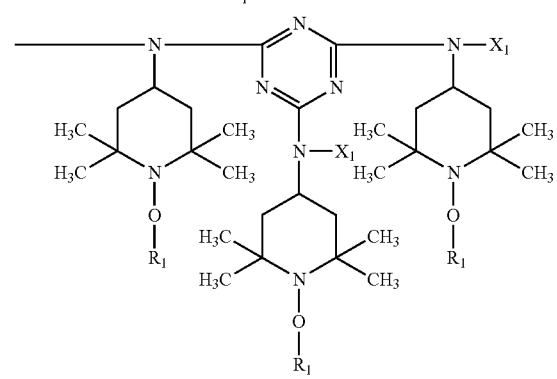

(II)

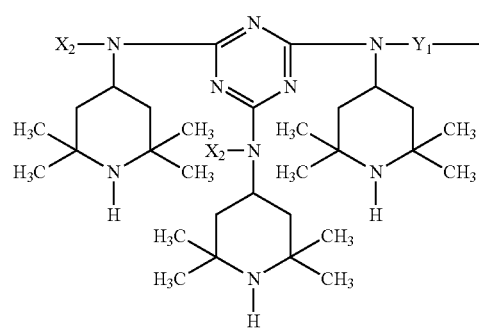

(Continued)

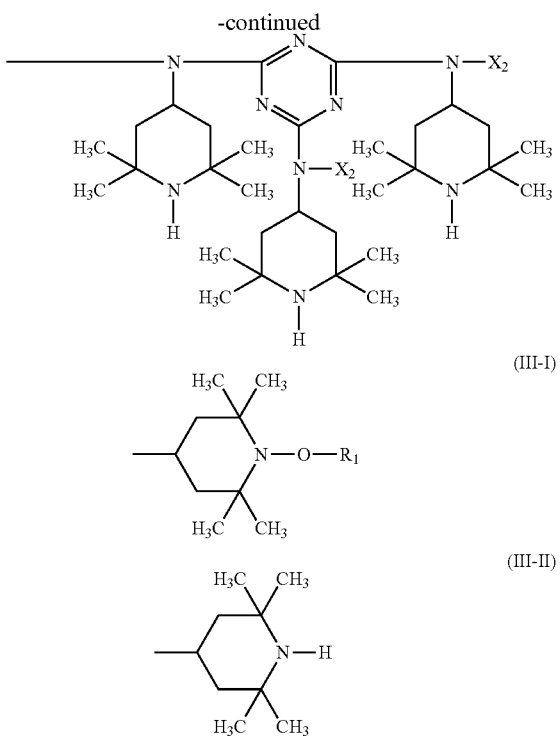

(III-I)

(III-II)

12 Claims, No Drawings

(51) Int. Cl.
  *C08K 5/3492* (2006.01)
  *C08K 5/00* (2006.01)
  *C09K 15/30* (2006.01)

(58) Field of Classification Search
  USPC .................................. 428/523, 500, 411.1
  See application file for complete search history.

(56) References Cited

U.S. PATENT DOCUMENTS

| | | | |
|---|---|---|---|
| 4,997,938 A | 3/1991 | Cantatore et al. | |
| 5,116,893 A | 5/1992 | Cantatore et al. | |
| 5,175,312 A | 12/1992 | Dubs et al. | |
| 5,216,052 A | 6/1993 | Nesvadba et al. | |
| 5,252,643 A | 10/1993 | Nesvadba et al. | |
| 5,268,401 A * | 12/1993 | Scrima | C07D 211/58 524/100 |
| 5,449,776 A * | 9/1995 | Vignali | C07D 401/14 540/543 |
| 6,046,304 A * | 4/2000 | Borzatta | C07D 401/14 528/423 |
| 6,114,420 A * | 9/2000 | Zedda | C07D 401/14 524/100 |
| 8,895,647 B2 * | 11/2014 | Menozzi | C08K 5/34926 524/100 |
| 9,464,070 B2 | 10/2016 | Menozzi et al. | |
| 2007/0060697 A1 | 3/2007 | Li et al. | |
| 2009/0111918 A1 | 4/2009 | Tsou et al. | |
| 2012/0232197 A1 * | 9/2012 | Menozzi | C07D 401/14 524/100 |
| 2013/0207043 A1 * | 8/2013 | Menozzi | C07D 401/14 252/403 |
| 2014/0336313 A1 * | 11/2014 | Menozzi | C08K 5/34926 524/100 |

FOREIGN PATENT DOCUMENTS

| | | |
|---|---|---|
| DE | 43 16 622 A1 | 11/1993 |
| DE | 43 16 876 A1 | 11/1993 |
| EP | 0 292 437 A2 | 11/1988 |
| EP | 0 589 839 A1 | 3/1994 |
| EP | 0 591 102 A1 | 4/1994 |
| EP | 0 782 994 A1 | 7/1997 |
| EP | 0782994 A1 * | 7/1997 ........... C07D 401/14 |
| EP | 1038912 | 9/2000 |
| EP | 1 291 384 A1 | 3/2003 |
| WO | WO 2011/029744 A1 | 3/2011 |
| WO | WO 2012/052377 A1 | 4/2012 |
| WO | WO-2012052377 A1 * | 4/2012 ........... C07D 401/14 |

OTHER PUBLICATIONS

International Search Report and Written Opinion of the International Searching Authority dated Jul. 21, 2015 in PCT/EP2015/060366 filed May 11, 2015.

European Search Report dated Oct. 30, 2014 in Patent Application No. 14 16 8430.

U.S. Appl. No. 15/233,479, filed Aug. 10, 2016, US 2016/0347736 A1, Edoardo Menozzi, et al.

Mar'in, et al. "Diffusion of high molecular weight, sterically hindered amines in polypropylene", Journal of Applied Polymer Science, vol. 75, Issue 7, Feb. 14, 2000, pp. 890-896.

* cited by examiner

HIGHLY EFFECTIVE STABILIZER

The present invention relates to a stabilizer composition containing two specific sterically hindered amine compounds, an organic material subject to degradation induced by light, heat or oxidation containing said stabilizer composition and the use of said stabilizer composition as well as to particular polymers containing only one sterically hindered amine compound of said stabilizer composition.

The stabilizer composition according to the present invention is particularly useful as light stabilizer in plastic applications, typically polyolefin applications, used in agriculture and characterized by high levels of contamination from chemicals (e.g. sulfur or chlorine containing compounds) used in the agronomic practice during soil disinfection and growth of the crops.

In more detail, the present invention relates to a stabilizer composition containing (I) a compound of the formula (I)

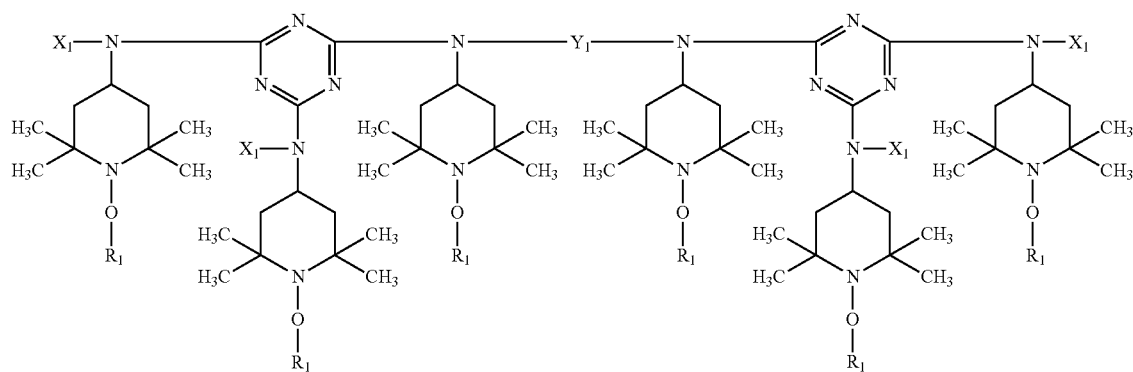

and
(II) a compound of the formula (II)

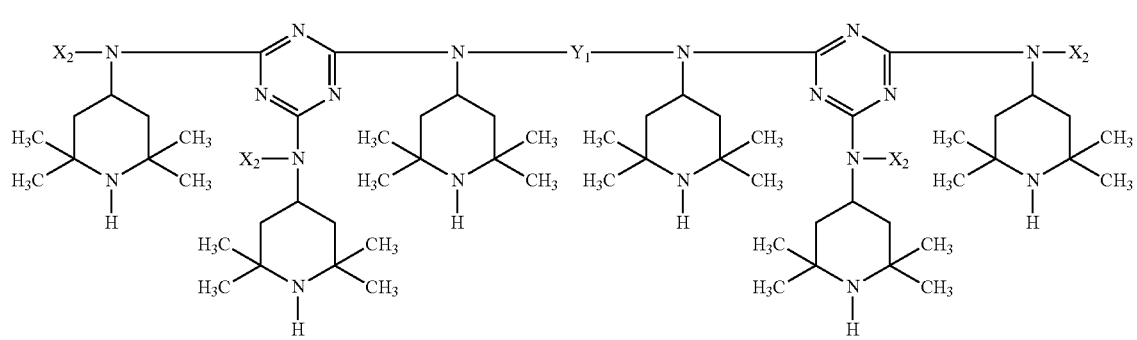

wherein
the radicals $R_1$ independently of one another are $C_1$-$C_{18}$ alkyl or $C_3$-$C_{12}$ cycloalkyl;
the radicals $X_1$ independently of one another are hydrogen, $C_1$-$C_{18}$ alkyl, $C_3$-$C_{12}$ cycloalkyl or a group of the formula (III-I);

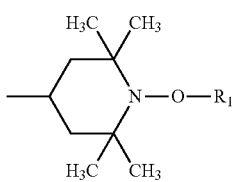

the radicals $X_2$ independently of one another are hydrogen, $C_1$-$C_{18}$ alkyl, $C_3$-$C_{12}$ cycloalkyl or a group of the formula (III-II);

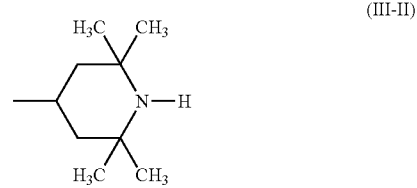

and $Y_1$ is $C_2$-$C_{12}$ alkylene.

Examples of $C_1$-$C_{18}$ alkyl are methyl, ethyl, propyl, isopropyl, n-butyl, sec-butyl, isobutyl, tert-butyl, 2-ethylbutyl, n-pentyl, isopentyl, 1-methyl-pentyl, 1,3-dimethyl-butyl, n-hexyl, 1-methyl-hexyl, n-heptyl, isoheptyl, 1,1,3,3-tetra-methyl-butyl, 1-methyl-heptyl, 3-methyl-heptyl, n-octyl, 2-ethyl-hexyl, 1,1,3-tri-methyl-hexyl, 1,1,3,3-tetra-methyl-pentyl, nonyl, decyl, undecyl, 1-methyl-undecyl, dodecyl, 1,1,3,3,5,5-hexa-methyl-hexyl, tridecyl, tetradecyl, pentadecyl, hexadecyl, heptadecyl and octadecyl.

Examples of $C_3$-$C_{12}$ cycloalkyl are cyclopentyl, cyclohexyl, cycloheptyl, cyclooctyl and cyclododecyl.

Examples of $C_2$-$C_{12}$ alkylene are ethylene, propylene, trimethylene, tetramethylene, pentamethylene, 2,2-dimethyltrimethylene and hexamethylene.

A preferred embodiment relates to a stabilizer composition wherein
the radicals $R_1$ independently of one another are $C_1$-$C_{12}$ alkyl or $C_3$-$C_6$ cycloalkyl;

the radicals $X_1$ independently of one another are hydrogen, $C_1$-$C_{12}$ alkyl or $C_3$-$C_6$ cycloalkyl; the radicals $X_2$ independently of one another are hydrogen, $C_1$-$C_{12}$ alkyl or $C_3$-$C_6$ cycloalkyl; and $Y_1$ is $C_2$-$C_6$ alkylene.

$R_1$, $X_1$ and $X_2$ are preferably $C_1$-$C_4$ alkyl and $Y_1$ is preferably hexamethylene.

According to a particularly preferred embodiment $R_1$ is n-propyl, $X_1$ and $X_2$ are n-butyl and $Y_1$ is hexamethylene.

In the stabilizer compositions according to the present invention the weight ratio of the compound of the formula (I) to the compound of the formula (II) is for example 1:20 to 20:1, preferably 1:10 to 10:1, in particular 1:5 to 5:1. Further examples of a suitable weight ratio are 3:1 to 1:3 and 2:1 to 1:2.

The compounds of the formulae (I) and (II) are known and can be prepared in analogy to processes known to those skilled in the art. The compounds of the formula (I) can be prepared for example in analogy to the method described in WO-A-2011/029,744 (equivalent to U.S. Pat. No. 8,895,647 which is incorporated by reference herein) and the compounds of the formula (II) can be prepared for example in analogy to the method described in EP-A-292,437 (equivalent to U.S. Pat. No. 4,997,938 and U.S. Pat. No. 5,116,893 which are incorporated by reference herein).

A further embodiment of the present invention relates to a composition containing
(A) an organic material subject to degradation induced by light, heat or oxidation, preferably a polyolefin,
and
(B) a stabilizer composition as defined above.

Examples of component (A) are

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).
b) catalytic polymerisation using a catalyst that normally contains one or more than one metal of groups IVb, Vb, Vlb or VIII of the Periodic Table. These metals usually have one or more than one ligand, typically oxides, halides, alcoholates, esters, ethers, amines, alkyls, alkenyls and/or aryls that may be either π or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimides, polyesterimides, polyhydantoins and polybenzimidazoles.

18. Polyesters derived from dicarboxylic acids and diols and/or from hydroxycarboxylic acids or the corresponding lactones or lactides, for example polyethylene terephthalate, polybutylene terephthalate, poly-1,4-dimethylolcyclohexane terephthalate, polyalkylene naphthalate and polyhydroxybenzoates as well as copolyether esters derived from hydroxyl-terminated polyethers, and also polyesters modified with polycarbonates or MBS. Copolyesters may comprise, for example—but are not limited to—polybutylenesuccinate/terephtalate, polybutyleneadipate/terephthalate, polytetramethyleneadipate/terephthalate, polybutylensuccinate/adipate, polybutylensuccinate/carbonate, poly-3-hydroxybutyrate/octanoate copolymer, poly-3-hydroxybutyrate/hexanoate/decanoate terpolymer. Furthermore, aliphatic polyesters may comprise, for example—but are not limited to—the class of poly(hydroxyalkanoates), in particular, poly(propiolactone), poly(butyrolactone), poly(pivalolactone), poly(valerolactone) and poly(caprolactone), polyethylenesuccinate, polypropylenesuccinate, polybutylenesuccinate, polyhexamethylenesuccinate, polyethyleneadipate, polypropyleneadipate, polybutyleneadipate, polyhexamethyleneadipate, polyethyleneoxalate, polypropyleneoxalate, polybutyleneoxalate, polyhexamethyleneoxalate, polyethylenesebacate, polypropylenesebacate, polybutylenesebacate and polylactic acid (PLA) as well as corresponding polyesters modified with polycarbonates or MBS. The term "polylactic acid (PLA)" designates a homopolymer of preferably poly-L-lactide and any of its blends or alloys with other polymers; a co-polymer of lactic acid or lactide with other monomers, such as hydroxy-carboxylic acids, like for example glycolic acid, 3-hydroxy-butyric acid, 4-hydroxy-butyric acid, 4-hydroxy-valeric acid, 5-hydroxy-valeric acid, 6-hydroxy-caproic acid and cyclic forms thereof; the terms "lactic acid" or "lactide" include L-lactic acid, D-lactic acid, mixtures and dimers thereof, i.e. L-lactide, D-lactide, meso-lacide and any mixtures thereof.

19. Polycarbonates and polyester carbonates.

20. Polyketones.

21. Polysulfones, polyether sulfones and polyether ketones.

22. Crosslinked polymers derived from aldehydes on the one hand and phenols, ureas and melamines on the other hand, such as phenol/formaldehyde resins, urea/formaldehyde resins and melamine/formaldehyde resins.

23. Drying and non-drying alkyd resins.

24. Unsaturated polyester resins derived from copolyesters of saturated and unsaturated dicarboxylic acids with polyhydric alcohols and vinyl compounds as crosslinking agents, and also halogen-containing modifications thereof of low flammability.

25. Crosslinkable acrylic resins derived from substituted acrylates, for example epoxy acrylates, urethane acrylates or polyester acrylates.

26. Alkyd resins, polyester resins and acrylate resins crosslinked with melamine resins, urea resins, isocyanates, isocyanurates, polyisocyanates or epoxy resins.

27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

29. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

30. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

31. Aqueous emulsions of natural or synthetic rubber, e.g. natural latex or latices of carboxylated styrene/butadiene copolymers.

The organic material is preferably selected from the group consisting of low density polyethylene, high density polyethylene, ethylene-vinyl acetate copolymer, ethylenebutyl acrylate copolymer, and polypropylene homo- or copolymer.

The stabilizer composition according to the present invention may be present in the organic material to be stabilized in an amount of preferably 0.005 to 10% or 0.005 to 5%, in particular 0.01 to 2.5% or 0.1 to 2%, relative to the weight of the organic material.

The individual components of the present stabilizer composition may be added to the organic material to be stabilized either individually or mixed with one another. They can be added to a polymer before or during the polymerization or before the crosslinking.

The stabilizer composition according to the present invention or its individual components can be incorporated into the organic material to be stabilized by known methods, for example before or during shaping or by applying the dissolved or dispersed stabilizer to the organic material, if necessary with subsequent evaporation of the solvent. The stabilizers can be added to the organic material in the form of a powder, granules or a masterbatch, which contains said stabilizers in, for example, a concentration of from 2.5 to 25% by weight.

Examples of Processing or Transformation of the Materials Stabilized According to the Present Invention are:

Injection blow molding, extrusion, blow molding, rotomolding, in mold decoration (back injection), slush molding, injection molding, co-injection molding, forming, compression molding, pressing, film extrusion (cast film; blown film), fiber spinning (woven, non-woven), drawing (uniaxial, biaxial), annealing, deep drawing, calandering, mechanical transformation, sintering, coextrusion, coating, lamination, crosslinking (radiation, peroxide, silane), vapor deposition, weld together, glue, vulkanization, thermoforming, pipe extrusion, profile extrusion, sheet extrusion; sheet casting, spin coating, strapping, foaming, recycling/rework, extrusion coating, visbreaking (peroxide, thermal), fiber melt blown, spun bonded, surface treatment (corona discharge, flame, plasma), sterilization (by gamma rays, electron beams), cast polymerization (R&M process, RAM extrusion), gel-coating, tape extrusion, GMT-process, SMC-process, plastisol, and dipping (PVC, latex).

The stabilized material may additionally also contain various conventional additives, for example:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-($\alpha$-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example $\alpha$-tocopherol, $\beta$-tocopherol, $\gamma$-tocopherol, $\delta$-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-($\alpha$-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-($\alpha$-methylbenzyl)-4-nonylphenol], 2,2'-methylenebis[6-($\alpha,\alpha$-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl) butane, 2,2-bis(3,5-di-tert-butyl-4-hydroxyphenyl)propane, 2,2-bis(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis (3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxy-phenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, di-octadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl] propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenyl-amine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the trans-esterification product of 2-[3'-tert-butyl-5'-(2-methoxycarbonylethyl)-2'-hydroxyphenyl]-2H-benzotriazole with polyethylene glycol 300;

where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline, neopentyl tetra(α-cyano-β,β-diphenylacrylate.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example carbonic acid bis(1-undecyloxy-2,2,6,6-tetramethyl-4-piperidyl)ester, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilot- riacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butyl-amino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5- trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl)ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine, 2,4-bis(4-biphenylyl)-6-[2-hydroxy-4-(2-ethylhexyloxy)phenyl]-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxy-pentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos®168, Ciba Specialty Chemicals Inc.), tris(nonylphenyl) phosphite,

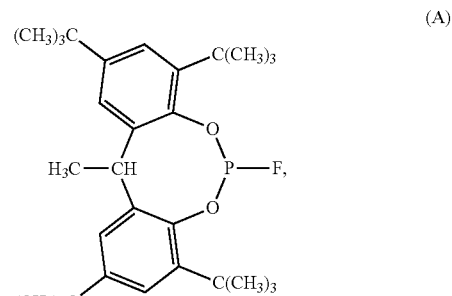

(A)

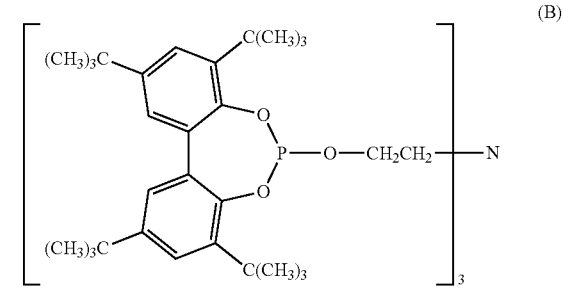

(B)

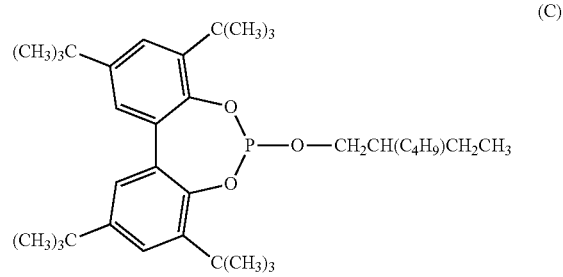

(C)

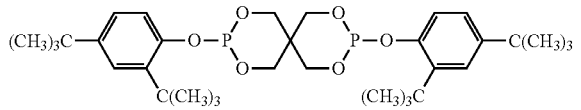

(D)

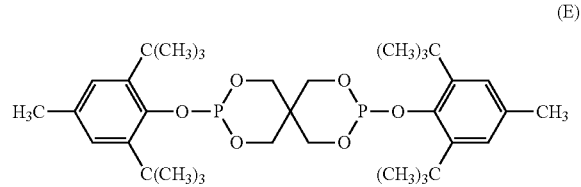

(E)

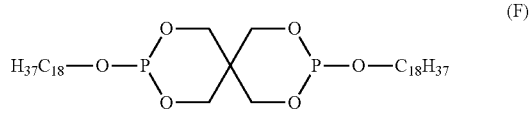

(F)

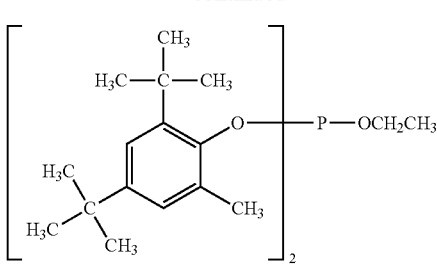

(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate, dimistryl thiodipropionate, distearyl thiodipropionate or distearyl disulfide.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

12. Fillers and reinforcing agents, for example calcium carbonate, silicates, surface treated silica (as described e.g. in US-A-2007/60,697 and US-A-2009/111,918), glass fibres, glass beads, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctylbenzofuran-2-one.

The weight ratio of the present stabilizer composition to the total amount of the conventional additive(s) can be for example 100:1 to 1:1000 or 10:1 to 1:100 or 10:1 to 1:10.

A further embodiment of the present invention is a composition which additionally contains (C) an UV absorber, preferably one of those listed above under 2.1, 2.2 or 2.8, and optionally (D) a further additive selected from the group consisting of antioxidants, slip agents, anti-block agents, thermal fillers, pigments, anti-fog and anti-mist agents.

The weight ratio of component (A) to component (C) is for example 100:1 to 1:1 or 20:1 to 3:1.

The weight ratio of Component (A) to Component (D) is for example 10:1 to 1:10 or 5:1 to 1:5.

The materials stabilized according to this invention can be used in a wide variety of forms, for example as films, fibres, tapes, moulding compositions, profiles or as binders for paints, adhesives or putties.

In more detail, the materials stabilized according to the present invention may be used for the preparation of the following devices:

I-1) Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.

I-2) Devices for plane, railway, motor car (car, motorbike) including furnishings.

I-3) Devices for space applications, in particular rockets and satellites, e.g. reentry shields.

I-4) Devices for architecture and design, mining applications, acoustic quietized systems, street refuges, and shelters.

II-1) Electric appliances, in particular washing machines, tumblers, ovens (microwave oven), dish-washers, mixers, and irons.

II-2) Foils for condensers, refrigerators, heating devices, air conditioners, encapsulating of electronics, semi-conductors, coffee machines, and vacuum cleaners.

III-1) Technical articles such as cogwheel (gear), slide fittings, spacers, screws, bolts, handles, and knobs.

III-2) Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes, sleeves, and conveyor belts.

III-3) Profiles of any geometry (window panes) and siding.

III-4) Glass substitutes, in particular extruded plates, glazing for buildings (monolithic, twin or multiwall), aircraft, schools, extruded sheets, window film for architectural glazing, train, transportation, sanitary articles, and greenhouse.

III-5) Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards, and tiles.

III-6) Cement-, concrete-, composite-applications and covers, siding and cladding, hand rails, banisters, kitchen work tops, roofing, roofing sheets, tiles, and tarpaulins.

IV-1) Plates (walls and cutting board), trays, artificial grass, astroturf, artificial covering for stadium rings (athletics), artificial floor for stadium rings (athletics), and tapes.

V-1) Plastic films in general (packaging, dump, laminating, swimming pools covers, waste bags, wallpaper, stretch and shrink wrap, raffia, desalination film, batteries, and connectors).

V-2) Agricultural films (greenhouse covers, tunnel, mulch, silage, bale wrap), especially in presence of intensive application of agrochemicals).

VI-1) Food packing and wrapping (flexible and solid), BOPP, BOPET, bottles.

VI-2) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Devices of filled polymers (talc, chalk, china clay (kaolin), wollastonite, pigments, carbon black, $TiO_2$, mica, nanocomposites, dolomite, silica, silicates, glass, asbestos).

Thus, another embodiment of the present invention is an article made of a composition as described above. A plastic article for agricultural use, preferably a thin film, typically obtained with the blow extrusion technology, is preferred. A monolayer film or a multilayer film of three, five or seven layers is of particular interest. The most important application of thin plastic films in agriculture is as covers for greenhouses and tunnels to grow crops in a protected environment.

A multilayer film, preferably a multilayer polyolefin film, in particular a multilayer polyethylene film, which contains a compound of the formula (I) in at least one layer and the compound of the formula (II) in another layer, is also preferred.

A further embodiment of the present invention is a method for stabilizing an organic material against degradation induced by light, heat or oxidation, which comprises incorporating into the organic material a stabilizer composition as defined above.

A further preferred embodiment of the present invention is the use of the present stabilizer composition for stabilizing plastic films, in particular polyolefin films used in agriculture and characterized by high levels of contamination from chemicals used in the agronomic practice during soil disinfection and growth of the crops.

Other Embodiments of the Present Invention are:
A composition containing
(1) a polymer selected from the group consisting of low density polyethylene, high density polyethylene, ethylene-vinyl acetate copolymer and ethylene-butyl acrylate copolymer, and
(2) a compound of the formula (II) as defined above, preferably in a concentration of 0.005 to 5%, in particular 0.01 to 2.5% or 0.1 to 2%, relative to the weight of the polymer of component (1).

A film, in particular a monolayer film or a multilayer film of three to seven layers, made of a composition containing the above components (1) and (2), preferably having a thickness less than 120 microns, typically of 60 to 100 microns.

A method for stabilizing a polymer selected from the group consisting of low density polyethylene, high density polyethylene, ethylene-vinyl acetate copolymer and ethylene-butyl acrylate copolymer, which comprises incorporating into said polymer a compound of the formula (II) as defined above.

The following examples illustrate the invention in greater detail. All percentages and parts are by weight, unless stated otherwise.

EXAMPLE 1: STABILIZATION OF LDPE (LOW DENSITY POLYETHYLENE) MULTI-LAYER FILMS

An appropriate amount of each formulation is weighted, containing 10% by weight in total of the light stabilizer(s) indicated in the table below, 0.4% by weight of tris{2,4-di-tert-butylphenyl} phosphite and 0.1% by weight of octadecyl 3-(3,5-di-tert-butyl-4-hydroxyphenyl)propionate as process stabilizers, and the rest of polyethylene powder (Polimeri Europa Riblene® FC 30, characterized by a density of 0.922 g/cm$^3$ and a melt flow index (190° C./2.16 Kg) of 0.27 g/10 min). The formulations are mixed in a turbo-mixer. Each masterbatch formulation is extruded at a maximum temperature of 200° C. in a lab-scale OMC twin-screw extruder (Ø 19 mm, L/D=25). 360 g of the granules so obtained for each masterbatch formulation are mixed with 30 g of a polyethylene masterbatch containing 0.4% by weight of tris{2,4-di-tert-butylphenyl} phosphite and 0.1% by weight of octadecyl 3-(3,5-di-tert-butyl-4-hydroxyphenyl)propionate as process stabilizers with 5610 g of the above indicated virgin polyethylene in pellets, in a Rhonrad® slow mixer for 10 minutes, resulting in the final formulation that contains 0.6% in total of the light stabilizer(s) indicated in the table below. Then, each final formulation is blown in a lab-scale Collin® 5-layer blow-extruder (Ø 20-25-30 mm, L/D 25), at a maximum temperature of 210° C., to give a 5-layer film of overall 150 μm thickness (45-5-50-5-45 μm), having the same formulation in all layers. The following formulations are prepared:

TABLE

| Formulation | Light stabilizer(s) |
| --- | --- |
| 1 | 0.3% by weight of Stabilizer (I-1) plus 0.3% by weight of Stabilizer (II-1) |
| 2 | 0.6% of Stabilizer (II-1) |

Stabilizer (I-1):

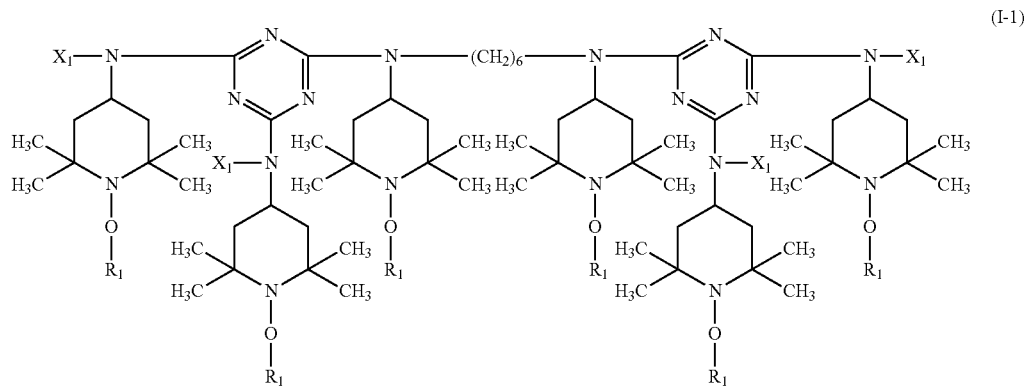

wherein $R_1$ is n-propyl and $X_1$ is n-butyl.

Stabilizer (II-1):

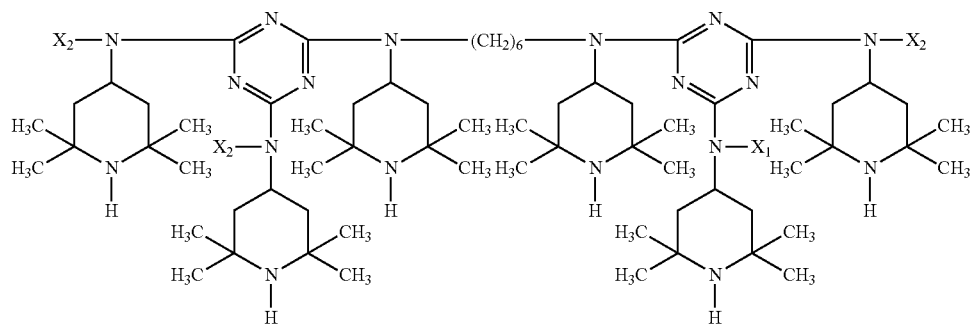

wherein $X_2$ is n-butyl.

The testing is aimed at combining light irradiation and use of agrochemicals known to have a detrimental effect on the light stability performance of the light stabilizers contained in them. To achieve such a purpose, an agrochemical treatment is carried out on the prepared films before artificial weathering. Specimens of the films for each formulation are mounted on a small experimental greenhouse (geographical coordinates: Lat. 44°25'''N Long.11°16'39"E), inside of which two burners of the type used in common agricultural practice are placed to allow sublimation of elemental sulfur, a widely used fungicide. The so-called "sulfur burning" is carried for 13 consecutive days, 6 hours per day, while the films are mounted on the small experimental greenhouse. The film specimens are covered with an additional single piece of opaque film to minimize the direct exposure of the sample to sunlight, in order to minimize in turn the effects of solar irradiation and hence the possible differences on samples exposed in subsequent test series. The amount of burnt sulfur is regulated and the weathering conditions closely monitored, so as to obtain the desired level of contamination from sulfur in the film samples, measured by Inductively Coupled Plasma.

After the agrochemical treatment, the film specimens for each formulation are exposed either in a Q-Panel QUV/se piece of equipment (QUV, as per ASTM G154, 1.55 W/m2 at 340 nm, cycle 6), or in an Atlas Weather-O-Meter (WOM, as per ASTM G155, 0.35 W/m2 at 340 nm, dry cycle), for accelerated light weathering. Specimens of the required formulations are taken at defined intervals of time after exposure and underwent either carbonyl increment evaluation or tensile testing. The carbonyl increment is measured by means of a Perkin-Elmer® Spectrum 100 FT-IR spectrophotometer, as a measure of the oxidation degree of the polymer; the residual tensile strength is measured, by means of a Zwick® Z1.0 constant velocity tensiometer (as per modified ISO 527), in order to evaluate the decay of the mechanical properties of the plastic film, as a consequence of the polymer degradation after its oxidation.

Experiment 1

The film samples are contaminated up to an average level of sulfur of 1300 ppm, then the films are exposed in the QUV and the carbonyl increment is regularly evaluated. The results are listed in Table 1.

TABLE 1

| Formulation | Light stabilizer(s) | Carbonyl increment after 687 hours exposure *) |
|---|---|---|
| 1 | 0.3% by weight of Stabilizer (I-1) plus 0.3% by weight of Stabilizer (II-1) | 0.136 |
| 2 | 0.6% by weight of Stabilizer (II-1) | 0.197 |

*) Low values are desired.

Experiment 2

The film samples are contaminated up to level of sulfur of more than 3000 ppm. Then, the films are exposed in the WOM and the carbonyl increment is regularly evaluated. The results are listed in Table 2.

TABLE 2

| Formulation | Light stabilizer(s) | Carbonyl increment after 1402 hours exposure *) |
|---|---|---|
| 1 | 0.3% by weight of Stabilizer (I-1) plus 0.3% by weight of Stabilizer (II-1) | 0.072 |
| 2 | 0.6% by weight of Stabilizer (II-1) | 0.164 |

*) Low values are desired.

Experiment 3

The film samples are contaminated up to level of sulfur of more than 3000 ppm. Then, the films are exposed in the WOM and the carbonyl increment is regularly evaluated. In this experiment samples are exposed for tensile testing and are regularly evaluated. The results are listed in Table 3.

TABLE 3

| Formulation | Light stabilizer(s) | Retained elongation at break (as % of initial) after 1320 hours exposure*) |
|---|---|---|
| 1 | 0.3% by weight of Stabilizer (I-1) plus 0.3% by weight of Stabilizer (II-1) | 100 |
| 2 | 0.6% by weight of Stabilizer (II-1) | 63 |

*)High values are desired.

EXAMPLE 2: STABILIZATION OF LDPE (LOW DENSITY POLYETHYLENE) MULTI-LAYER FILMS

An appropriate amount of each formulation is weighted, containing 10% by weight in total of the light stabilizer(s) indicated in the table below, 0.4% by weight of tris{2,4-di-tert-butylphenyl} phosphite and 0.1% by weight of octadecyl 3-(3,5-di-tert-butyl-4-hydroxyphenyl)propionate as process stabilizers, and the rest of polyethylene powder (Polimeri Europa Riblene® FC 30, characterized by a density of 0.922 g/cm$^3$ and a melt flow index (190° C./2.16 Kg) of 0.27 g/10 min). The formulations are mixed in a turbo-mixer. Each masterbatch formulation is extruded at a maximum temperature of 200° C. in a lab-scale OMC twin-screw extruder (Ø 19 mm, L/D=25). 360 g of the granules so obtained for each masterbatch formulation are mixed with 30 g of a polyethylene masterbatch containing 0.4% by weight of tris{2,4-di-tert-butylphenyl} phosphite and 0.1% by weight of octadecyl 3-(3,5-di-tert-butyl-4-hydroxyphenyl)propionate as process stabilizers with 5610 g of the above indicated virgin polyethylene in pellets, in a Rhonrad® slow mixer for 10 minutes, resulting in the final formulation that contains 0.6% in total of the light stabilizer(s) indicated in the table below. Then, each final formulation is blown in a lab-scale Collin® 5-layer blow-extruder (Ø 20-25-30 mm, L/D 25), at a maximum temperature of 210° C., to give a 5-layer film (layers A-B-C-D-E) of overall 150 µm thickness (45-5-50-5-45 µm for each layer respectively. The following formulations are prepared:

TABLE

| Formulation | Light stabilizer(s) |
|---|---|
| 2-1 | 0.3% by weight of Stabilizer (I-1) plus 0.3% by weight of Stabilizer (II-1) in all layers |
| 2-2 | 0.6% of Stabilizer (II-1) in all layers |
| 2-3 | 0.6% by weight of Stabilizer (I-1) in layers A-B-D-E plus 0.6% by weight of Stabilizer (II-1) in layer C |

Stabilizer (I-1):

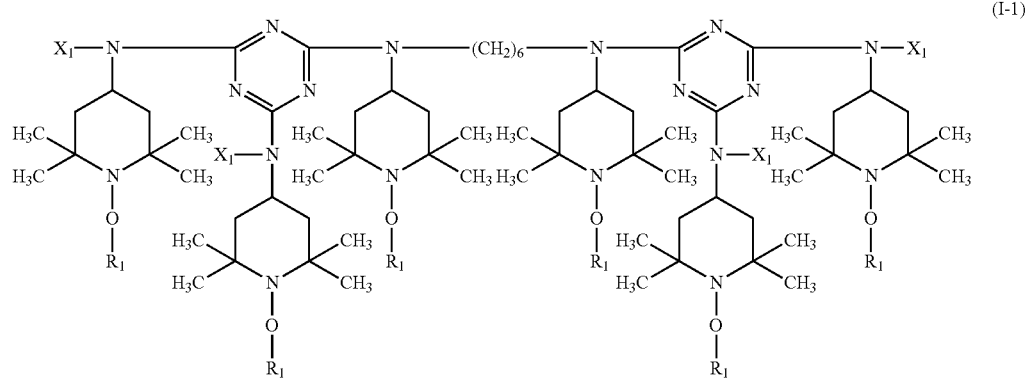

(I-1)

wherein R$_1$ is n-propyl and X$_1$ is n-butyl.

Stabilizer (II-1):

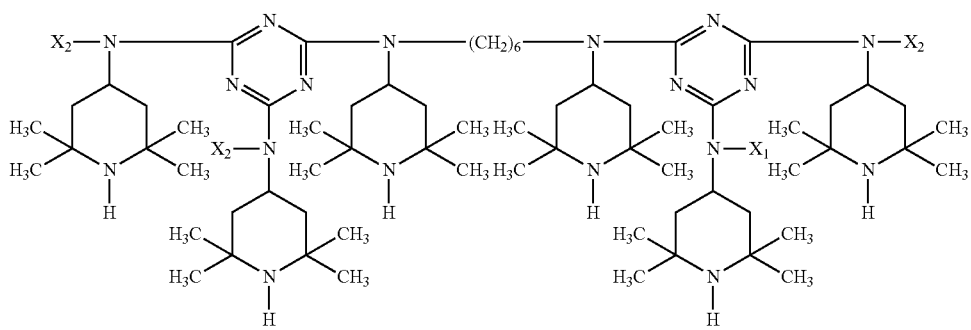

wherein $X_2$ is n-butyl.

The testing is aimed at combining light irradiation and use of agrochemicals known to have a detrimental effect on the light stability performance of the light stabilizers contained in them. To achieve such a purpose, an agrochemical treatment is carried out on the prepared films before artificial weathering. Specimens of the films for each formulation are mounted on a small experimental greenhouse (geographical coordinates: Lat. 44°25'40"N Long.11°16'39"E), inside of which two burners of the type used in common agricultural practice are placed to allow sublimation of elemental sulfur, a widely used fungicide. The so-called "sulfur burning" is carried for 13 consecutive days, 6 hours per day, while the films are mounted on the small experimental greenhouse. The film specimens are covered with an additional single piece of opaque film to minimize the direct exposure of the sample to sunlight, in order to minimize in turn the effects of solar irradiation and hence the possible differences on samples exposed in subsequent test series. The amount of burnt sulfur is regulated and the weathering conditions closely monitored, so as to obtain the desired level of contamination from sulfur in the film samples, measured by Inductively Coupled Plasma.

After the agrochemical treatment, the film specimens for each formulation are exposed either in a Q-Panel QUV/se piece of equipment (QUV, as per ASTM G154, 1.55 W/m2 at 340 nm, cycle 6), or in an Atlas Weather-O-Meter (WOM, as per ASTM G155, 0.35 W/m2 at 340 nm, dry cycle), for accelerated light weathering. Specimens of the required formulations are taken at defined intervals of time after exposure and underwent either carbonyl increment evaluation or tensile testing. The carbonyl increment is measured by means of a Perkin-Elmer® Spectrum 100 FT-IR spectrophotometer, as a measure of the oxidation degree of the polymer; the residual tensile strength is measured, by means of a Zwick® Z1.0 constant velocity tensiometer (as per modified ISO 527), in order to evaluate the decay of the mechanical properties of the plastic film, as a consequence of the polymer degradation after its oxidation.

Experiment 4

The film samples are contaminated up to an average level of sulfur of 1300 ppm, then the films are exposed in the QUV and the carbonyl increment is regularly evaluated. The results are listed in Table 4.

TABLE 4

| Formulation | Light stabilizer(s) | Time in hours to reach 0.4 of carbonyl increment[*] |
|---|---|---|
| 2-1 | 0.3% by weight of Stabilizer (I-1) plus 0.3% by weight of Stabilizer (II-1) in all layers | 1152 |
| 2-2 | 0.6% by weight of Stabilizer (II-1) in all layers | 833 |
| 2-3 | 0.6% by weight of Stabilizer (I-1) in layers A-B-D-E plus 0.6% by weight of Stabilizer (II-1) in layer C | 931 |

[*]High values are desired.

Experiment 5

The film samples are contaminated up to level of sulfur of more than 3000 ppm. Then, the films are exposed in the WOM for tensile testing and are regularly evaluated. The results are listed in Table 5.

TABLE 5

| Formulation | Light stabilizer(s) | Time in hours to reach 50% of the initial elongation to break[*] |
|---|---|---|
| 2-1 | 0.3% by weight of Stabilizer (I-1) plus 0.3% by weight of Stabilizer (II-1) in all layers | 2365 |
| 2-2 | 0.6% by weight of Stabilizer (II-1) in all layers | 1636 |
| 2-3 | 0.6% by weight of Stabilizer (I-1) in layers A-B-D-E plus 0.6% by weight of Stabilizer (II-1) in layer C | 4112 |

[*]High values are desired.

The invention claimed is:

1. A stabilizer composition, containing (I) a compound of formula (I)

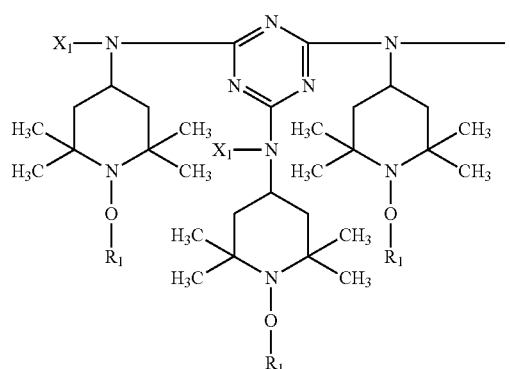

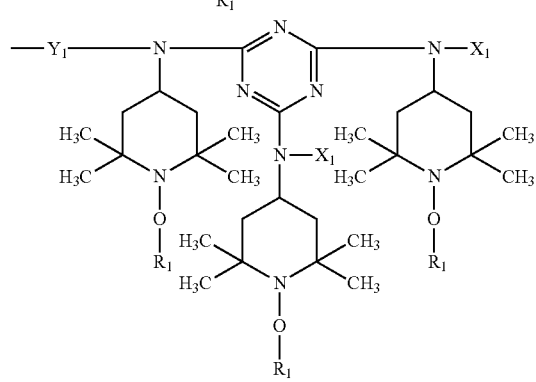

and (II) a compound of formula (II)

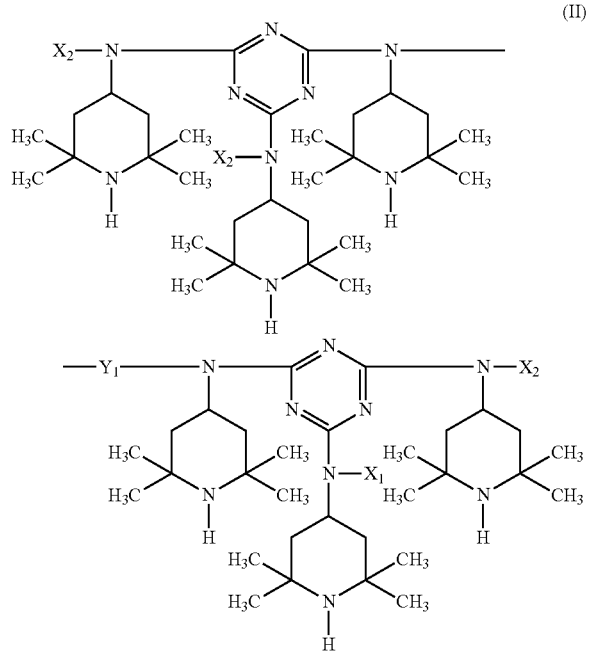

wherein
radicals $R_1$ independently of one another are $C_1$-$C_{18}$ alkyl or $C_3$-$C_{12}$ cycloalkyl;
radicals $X_1$ independently of one another are hydrogen, $C_1$-$C_{18}$ alkyl, $C_3$-$C_{12}$ cycloalkyl or a group of formula (III-I)

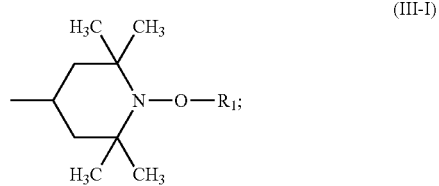

radicals $X_2$ independently of one another are hydrogen, $C_1$-$C_{18}$ alkyl, $C_3$-$C_{12}$ cycloalkyl or a group of formula (III-II)

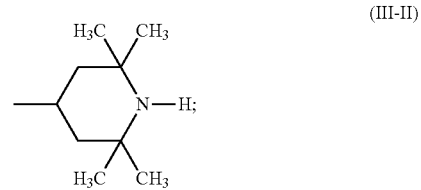

and
$Y_1$ is $C_2$-$C_{12}$ alkylene.

2. The stabilizer composition according to claim 1, wherein
the radicals $R_1$ independently of one another are $C_1$-$C_{12}$ alkyl or $C_3$-$C_6$ cycloalkyl;
the radicals $X_1$ independently of one another are hydrogen, $C_1$-$C_{12}$ alkyl or $C_3$-$C_6$ cycloalkyl;
the radicals $X_2$ independently of one another are hydrogen, $C_1$-$C_{12}$ alkyl or $C_3$-$C_6$ cycloalkyl; and
$Y_1$ is $C_2$-$C_6$ alkylene.

3. The stabilizer composition according to claim 1, wherein the radicals $R_1$, $X_1$ and $X_2$ are $C_1$-$C_4$ alkyl, and $Y_1$ is hexamethylene.

4. The stabilizer composition according to claim 1, wherein $R_1$ is n-propyl, $X_1$ and $X_2$ are n-butyl, and $Y_1$ is hexamethylene.

5. The stabilizer composition according to claim 1, wherein a weight ratio of the compound of the formula (I) to the compound of the formula (II) is 1:5 to 5:1.

6. A composition, containing
(A) an organic material subject to degradation induced by light, heat or oxidation and
(B) the stabilizer composition as defined in claim 1.

7. The composition according to claim 6, wherein the organic material is selected from the group consisting of low density polyethylene, high density polyethylene, ethylene-vinyl acetate copolymer, ethylene-butyl acrylate copolymer, and polypropylene homo- or copolymer.

8. The composition according to claim 6, which additionally contains
(C) an UV absorber
and optionally
(D) a further additive selected from the group consisting of an antioxidant, a slip agent, an anti-block agent, a thermal filler, a pigment, and an anti-fog and anti-mist agent.

9. An article, comprising
the composition according to claim 6.

10. The article according to claim 9, which is a monolayer film or a multilayer film of three to seven layers.

11. The article according to claim 10, which is a multilayer film, which contains the compound of the formula (I) in at least one layer and the compound of the formula (II) in another layer.

12. A method for stabilizing an organic material against degradation induced by light, heat or oxidation, the method comprising:
   incorporating into the organic material the stabilizer composition as defined in claim 1.

* * * * *

UNITED STATES PATENT AND TRADEMARK OFFICE
CERTIFICATE OF CORRECTION

PATENT NO. : 10,253,164 B2
APPLICATION NO. : 15/310686
DATED : April 9, 2019
INVENTOR(S) : Manuele Vitali et al.

Page 1 of 3

It is certified that error appears in the above-identified patent and that said Letters Patent is hereby corrected as shown below:

In the Specification

Column 6, Line 31, "terephtalate," first and second occurrence should read --terephthalate,--.

Column 8, Line 11, "vulkanization," should read --vulcanization,--.

Column 9, Line 46, "octadecyl3" should read --octadecyl 3--.

Column 15, Lines 24-25, "tridecylnnitrone," should read --tridecylnitrone,--.

Column 17, Line 22, "tetrapack" should read --tetrapak--;
    17, Line 42, "wheely" should read --wheelie--.

Columns 19-20, Lines 30-35 (Approx.), delete

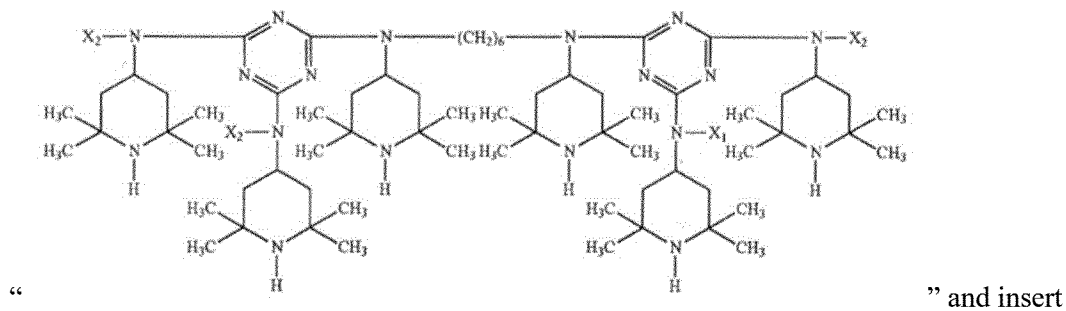

" and insert

Signed and Sealed this
Third Day of December, 2019

Andrei Iancu
*Director of the United States Patent and Trademark Office*

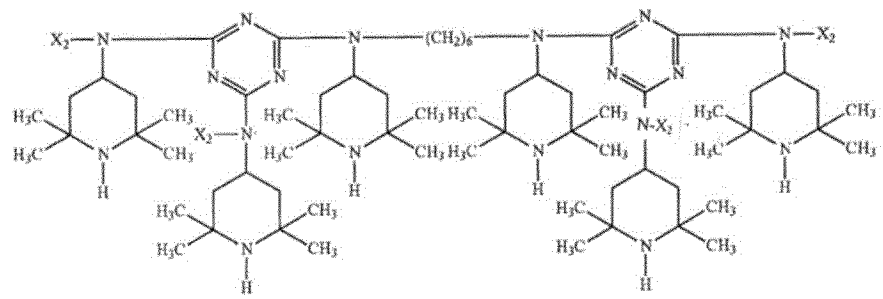
--.
Columns 23-24, Lines 10-15 (Approx.), delete
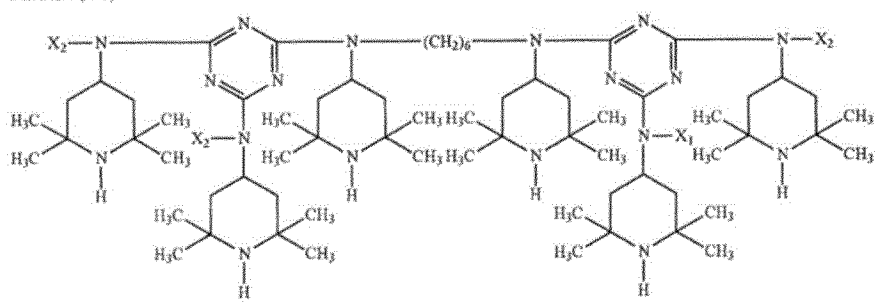
" and insert
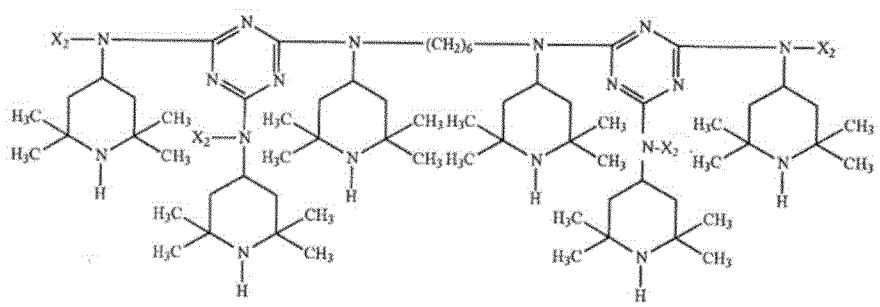
--.

CERTIFICATE OF CORRECTION (continued)
U.S. Pat. No. 10,253,164 B2

In the Claims

Columns 25, Lines 45-65 (Approx.), Claim 1, delete

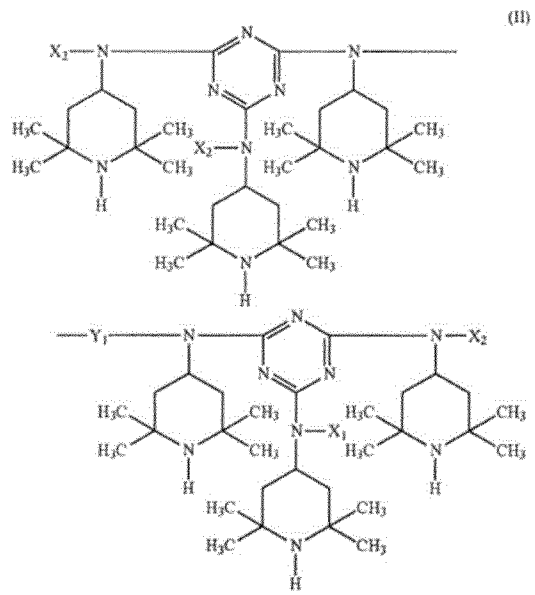

" and insert

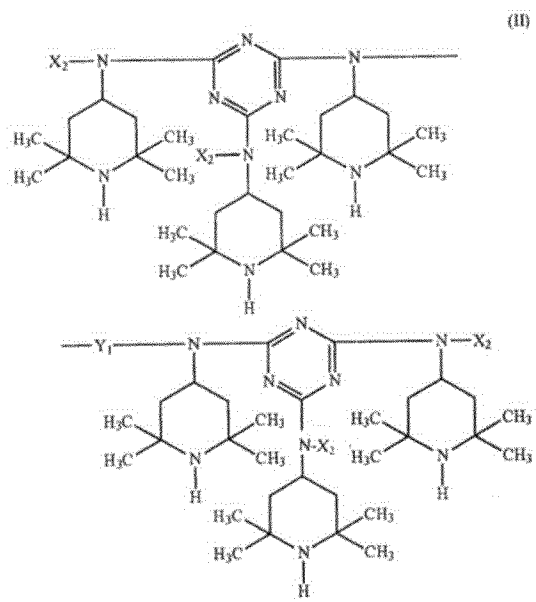

-- --.